US012228877B2

(12) United States Patent
Munetsugu et al.

(10) Patent No.: US 12,228,877 B2
(45) Date of Patent: Feb. 18, 2025

(54) PROCESS CARTRIDGE AND IMAGE FORMING APPARATUS

(71) Applicant: CANON KABUSHIKI KAISHA, Tokyo (JP)

(72) Inventors: Hiroyuki Munetsugu, Kanagawa (JP); Ryota Shibuya, Kanagawa (JP); Goshi Ozaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/241,266

(22) Filed: Sep. 1, 2023

(65) Prior Publication Data

US 2023/0408970 A1 Dec. 21, 2023

Related U.S. Application Data

(62) Division of application No. 17/965,055, filed on Oct. 13, 2022, now Pat. No. 11,796,958, which is a (Continued)

(30) Foreign Application Priority Data

Dec. 28, 2018 (JP) ................................ 2018-247839

(51) Int. Cl.
*G03G 21/16* (2006.01)
*G03G 21/18* (2006.01)

(52) U.S. Cl.
CPC ..... *G03G 21/1814* (2013.01); *G03G 21/1821* (2013.01)

(58) Field of Classification Search
CPC ........... G03G 21/1814; G03G 21/1817; G03G 21/1821; G03G 21/1867; G03G 21/1871;
(Continued)

(56) References Cited

U.S. PATENT DOCUMENTS 8,160,478 B2 4/2012 Munetsugu et al.
8,165,493 B2 4/2012 Chadani et al.
(Continued)

FOREIGN PATENT DOCUMENTS

EP 3 144 739 A 3/2017
JP H07-234552 A 9/1996
(Continued)

OTHER PUBLICATIONS

Written Opinion of the International Searching Authority and International Search Report in PCT/JP2019/051649, dated May 4, 2020.
(Continued)

*Primary Examiner* — Hoang X Ngo
(74) *Attorney, Agent, or Firm* — Venable LLP

(57) ABSTRACT

A process cartridge includes a photosensitive drum unit provided with a photosensitive drum that is rotatable about a first rotational axis. The photosensitive drum unit also includes a first positioning portion configured to position the process cartridge to a main assembly in the mounting direction. The photosensitive drum further includes a second positioning portion configured to position the process cartridge to the main assembly so as not to rotate relative to the main assembly. The process cartridge also includes a developing unit including a developing roller rotatable about a second rotational axis, with the developing unit being provided with a storing means having a contact surface. As seen in the direction of the first rotational axis, a first line segment connecting a center of the first positioning portion and a center of the second positioning portion and a first linear line passing through the contact surface and perpendicular to the contact surface intersect with each other at an intersection. The intersection is located at a position closer to the second positioning portion than to the first positioning portion.

7 Claims, 11 Drawing Sheets

Related U.S. Application Data division of application No. 17/299,353, filed as application No. PCT/JP2019/051649 on Dec. 26, 2019, now Pat. No. 11,567,445.

(58) Field of Classification Search
CPC ........... G03G 21/1875; G03G 21/1878; G03G 2221/1823
See application file for complete search history.

(56) References Cited

U.S. PATENT DOCUMENTS

| | | | |
|---|---|---|---|
| 8,559,849 | B2 | 10/2013 | Suzuki et al. |
| 9,213,306 | B2 | 12/2015 | Morioka et al. |
| 9,377,714 | B2 | 6/2016 | Nakazawa et al. |
| 9,651,916 | B2 | 5/2017 | Kawakami et al. |
| 9,785,091 | B2 | 10/2017 | Fukasawa et al. |
| 9,817,361 | B2 | 11/2017 | Fukasawa et al. |
| 10,133,215 | B2 | 11/2018 | Fukasawa et al. |
| 10,386,786 | B2 | 8/2019 | Sato et al. |
| 10,459,402 | B2 | 10/2019 | Kashiide et al. |
| 10,635,047 | B2 | 4/2020 | Kamoshida et al. |
| 10,782,647 | B2 | 9/2020 | Kashiide et al. |
| 10,859,972 | B2 | 12/2020 | Abe et al. |
| 11,067,950 | B2 | 7/2021 | Kashiide et al. |
| 2006/0228127 | A1 | 10/2006 | Miyabe et al. |
| 2008/0024077 | A1 | 10/2008 | Fukamachi et al. |
| 2008/0250774 | A1 | 10/2008 | Fukamachi et al. |
| 2016/0139558 | A1 | 5/2016 | Kawakami et al. |
| 2017/0075293 | A1 | 3/2017 | Fukaswa |
| 2017/0261927 | A1 | 9/2017 | Sato et al. |
| 2018/0107155 | A1 | 4/2018 | Shimizu et al. |
| 2018/0203408 | A1 | 7/2018 | Itabashi et al. |
| 2019/0294101 | A1 | 9/2019 | Shimizu et al. |
| 2019/0391529 | A1 | 12/2019 | Abe et al. |
| 2020/0142353 | A1 | 5/2020 | Sato et al. |
| 2020/0249623 | A1 | 8/2020 | Sato et al. |
| 2020/0301352 | A1 | 9/2020 | Matsumaru et al. |
| 2021/0080904 | A1 | 3/2021 | Abe et al. |
| 2021/0263467 | A1 | 8/2021 | Sato et al. |

FOREIGN PATENT DOCUMENTS

| | | | |
|---|---|---|---|
| JP | 2006-293003 | A | 10/2006 |
| JP | 2008-224782 | A | 9/2008 |
| JP | 2008-249802 | A | 10/2008 |
| JP | 2016-099403 | A | 5/2016 |
| JP | 2017-058516 | A | 3/2017 |
| JP | 2018-066973 | A | 4/2018 |
| WO | 2018-131224 | A | 7/2018 |
| WO | 2018/163452 | A1 | 9/2018 |

OTHER PUBLICATIONS

Oct. 12, 2022 Office Action in Japanese Patent Application Pub. No. 2018-247839 (with English translation).
Oct. 18, 2022 Office Action in Japanese Patent Application Pub. No. 2018-247839 (with English translation).
Written Opinion of International Searching Authority and International Search Report in PCT/JP2019/051649, dated May 4, 2020.
Aug. 8, 2023 Office Action in Japanese Patent Application Pub. No. 2023-006492 (with English translation).

PROCESS CARTRIDGE AND IMAGE FORMING APPARATUS

TECHNICAL FIELD

The present invention relates to a process cartridge which is dismountably mountable to an apparatus main assembly of an image forming apparatus.

BACKGROUND ART

Conventionally, an image forming apparatus which forms an image on a recording material using an electrophotographic image forming method is known. Such image forming apparatuses include, for example, electrophotographic copying machines, electrophotographic printers (such as LED printers or laser beam printers), facsimile machines, and word processors.

Such an image forming apparatus generally requires toner replenishment and maintenance of various process means. On the contrary, a process cartridge in which a photosensitive drum and at least one of charging means, developing means, and cleaning means as process means acting on the photosensitive drum are integrated in a frame into a form of a cartridge has been put into practical use. By dismountably mounting such a process cartridge to the image forming apparatus main assembly, the toner replenishment and the maintenance operation can be made easier.

According to this process cartridge type, the portion of the apparatus maintenance operation can be performed, in effect, by the user without relying on a service person in charge of after-sales service. Such a process cartridge or an image forming apparatus loaded with this process cartridge can facilitate maintenance operation and can easily improve print quality. As described above, the process cartridge system can significantly improve the operability of the apparatus and can provide an image forming apparatus with excellent usability, and therefore, it is widely used with image forming apparatuses.

Conventionally, in the process cartridge, an electrostatic latent image on the photosensitive drum is developed with a developing roller provided in close proximity to the photosensitive drum. As a means for bring the developing roller close to the photosensitive drum, a structure is known in which a developing unit including a developing roller is rotatably coupled to a drum unit including a photosensitive drum so that the photosensitive drum and the developing roller can be brought into contact with and separated from each other. With this structure, by pressing the developing roller toward the photosensitive drum, the photosensitive drum and the developing roller can be kept in a close proximity with each other.

In addition, a process cartridges are known which have built-in memory such as storage means or storage elements in which service information and print quality information are registered. In addition, when the process cartridge is mounted in the image forming apparatus, the memory can communicate with the electric contact portion on the image forming apparatus side at a constant pressure. For example, Japanese Patent Laid-Open No. 2016-099403 discloses a cartridge in which a developing unit includes a memory.

Here, in order to accomplish proper developing property which provides stable image quality, it is preferable that the developing roller is kept close to the photosensitive drum with a predetermined gap therebetween by urging the developing roller toward the photosensitive drum with spaces therebetween. That is, it is desirable to stabilize the urging force.

However, in conventional process cartridges, the part of the process cartridge where the process cartridge is positioned relative to the image forming apparatus may be deformed by a constant pressure imparted to the memory. If this positioned portion is deformed, the position of the developing roller relative to the photosensitive drum changes, and therefore, the gap between the developing roller and the photosensitive drum changes. In conventional process cartridges, in order to suppress such changes in the gap, it is necessary to use high-rigidity materials such that the degree of the deformation is practically no problem, or to manage the dimensions of the portions influential to the gap with high accuracy.

SUMMARY OF THE INVENTION

According to an aspect of the present invention, there is provided a process cartridge detachably mountable to a main assembly of an image forming apparatus, said process cartridge comprising a photosensitive drum unit including a photosensitive drum, and a first and second positioning portions configured to position said photosensitive drum unit relative to the main assembly; and a developing unit connected with said photosensitive drum unit, said developing unit including a developing roller, a storing means having a contact surface electrically connectable with a main assembly contact of the main assembly to communicate with the main assembly, wherein as seen in an axial direction of said photosensitive drum, a first line segment connecting the first positioning portion and the second positioning portion with each other and a first linear line passing through the contact surface and perpendicular to the contact surface crosses with each other.

Further features of the present invention will become apparent from the following description of exemplary embodiments with reference to the mounted drawings.

EMBODIMENTS FOR CARRYING OUT THE INVENTION

In the following, embodiments will be described in detail with reference to the accompanying drawings.

<Structure of Image Forming Apparatus>

The structure of the image forming apparatus according to the embodiment will be described in detail with reference to FIG. 1.

Figure 1:
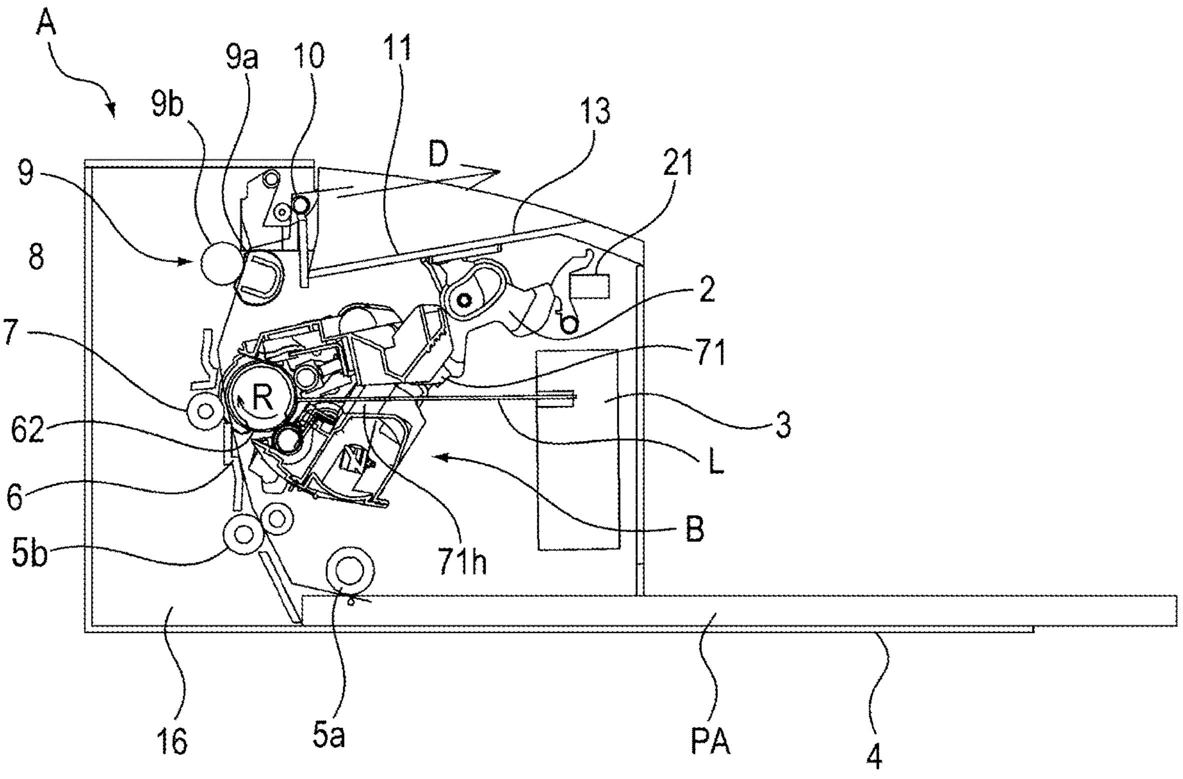
FIG. 1 is a schematic illustration of an image forming apparatus according to an embodiment of the present invention.

The image forming apparatus shown in FIG. 1 is an electrophotographic image forming apparatus, and has a structure in which a cartridge B is mountable to and dismountable from the apparatus main assembly A. Here, a laser beam printer using electrophotographic technology is exemplified.

The apparatus main assembly A is a portion excluding the cartridge B of the image forming apparatus. In the main assembly A, along a conveyance direction D of a sheet material PA, a pickup roller 5*a*, a feeding roller pair 5*b*, a transfer guide 6, a transfer roller 7, a conveyance guide 8, a fixing device 9, a discharge roller pair 10 and a discharge tray 11 and the like are sequentially arranged. The fixing device 9 comprises a heating roller 9*a* and a pressure roller 9*b*. In the apparatus main assembly A, a sheet tray 4 containing sheet materials PA as recording materials to be subjected image forming operation is disposed below the cartridge B.

The cartridge B has an exposure device 3 which is a laser scanner unit for forming a latent image on a photosensitive drum 62 which is a photosensitive member (electrophotographic photosensitive member) used for electrophotographic image formation.

<Structure of Cartridge>

Referring to FIG. 1 to FIG. 8, the structure of the cartridge B of the image forming apparatus according to the embodiment will be described in detail. Here, in this embodiment, the description and explanation regarding the screws connecting the parts are omitted.

The cartridge B includes a developing unit 20 and a cleaning unit 60, and is a process cartridge which is dismountably mountable to the apparatus main assembly A. The cleaning unit 60 and the developing unit 20 are constituted so as to be pivotably coupled.

Here, in the longitudinal direction of the cartridge B, the side on which the photosensitive drum 62 receives the driving force from the apparatus main assembly A is a driving side, and the opposite side is a non-driving side.

The developing unit 20 includes a developer container 23, a toner chamber 29, a developing roller 32, a blowout prevention sheet 33, and a developing blade 42.

The developer container 23 supports the developing roller 32.

The toner chamber 29 is constituted by a developer container 23 and a bottom member 22. In the toner chamber 29, a stirring member 43 is provided.

The developing roller 32 is rotatably mounted in the developer container 23 by a bearing member 26 (FIG. 4) and a bearing member 27 (FIG. 5) provided at the opposite ends. In the developing roller 32, a magnet roller 34 is provided. A spacing members 38 are mounted at the opposite ends of the developing roller 32, respectively. The developing roller 32 is mounted to the developer container 23 with a small gap between the developing roller 32 and the photosensitive drum 62 when the spacing member 38 and the photosensitive drum 62 are in contact to each other. The developing roller 32 is a developer carrying member which carries the toner T on the surface thereof in order to develop the latent image formed on the photosensitive drum 62.

The blowout prevention sheet 33 is provided at the edge of the bottom member 22 so as to contact the developing roller 32 to prevent the toner from leaking from the developing unit 20 to the outside.

The developing blade 42 regulates the toner layer formed on the developing roller 32.

The stirring member 43 stirs the toner stored in the toner chamber 29 and conveys the toner to the toner supply chamber 28.

Figure 3:
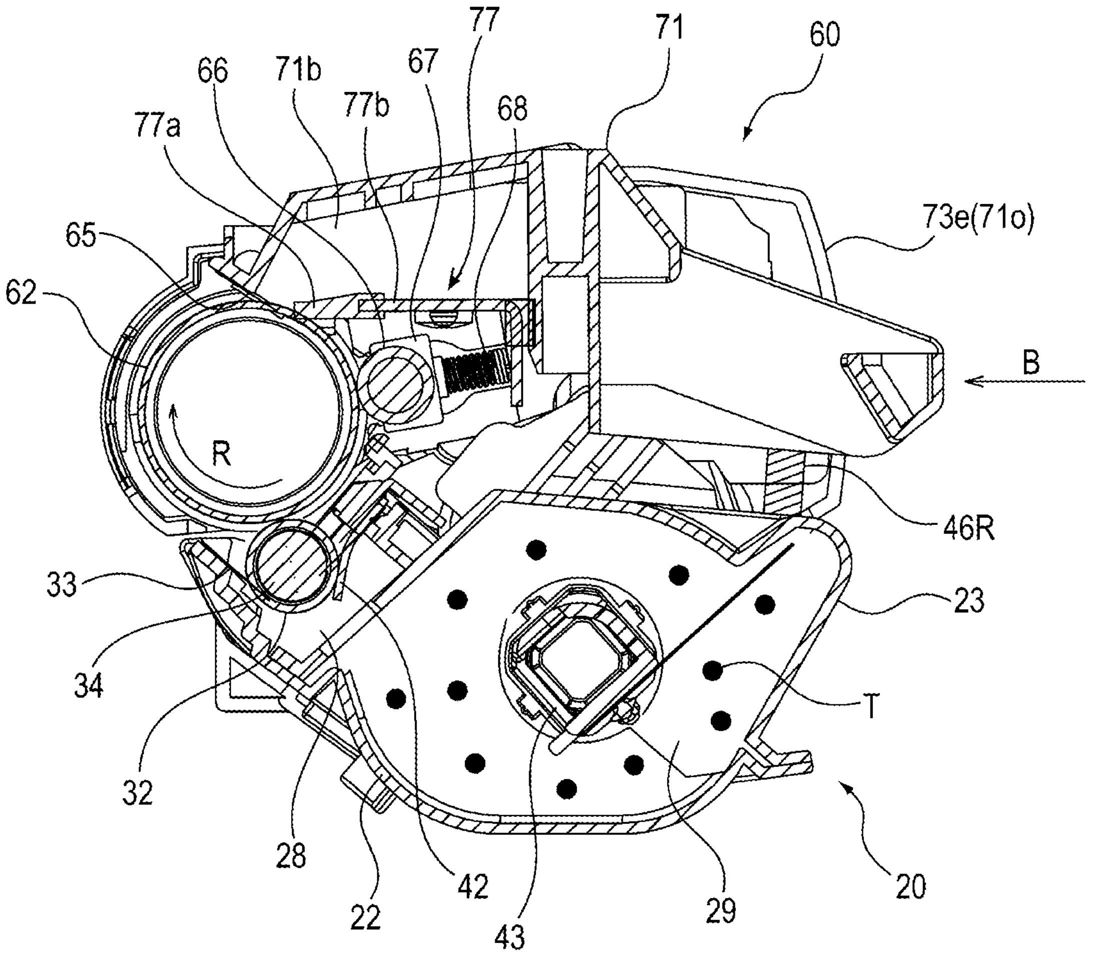
FIG. 3 is a cross-sectional view of the cartridge usable with the image forming apparatus according to the embodiment.
Figure 4:
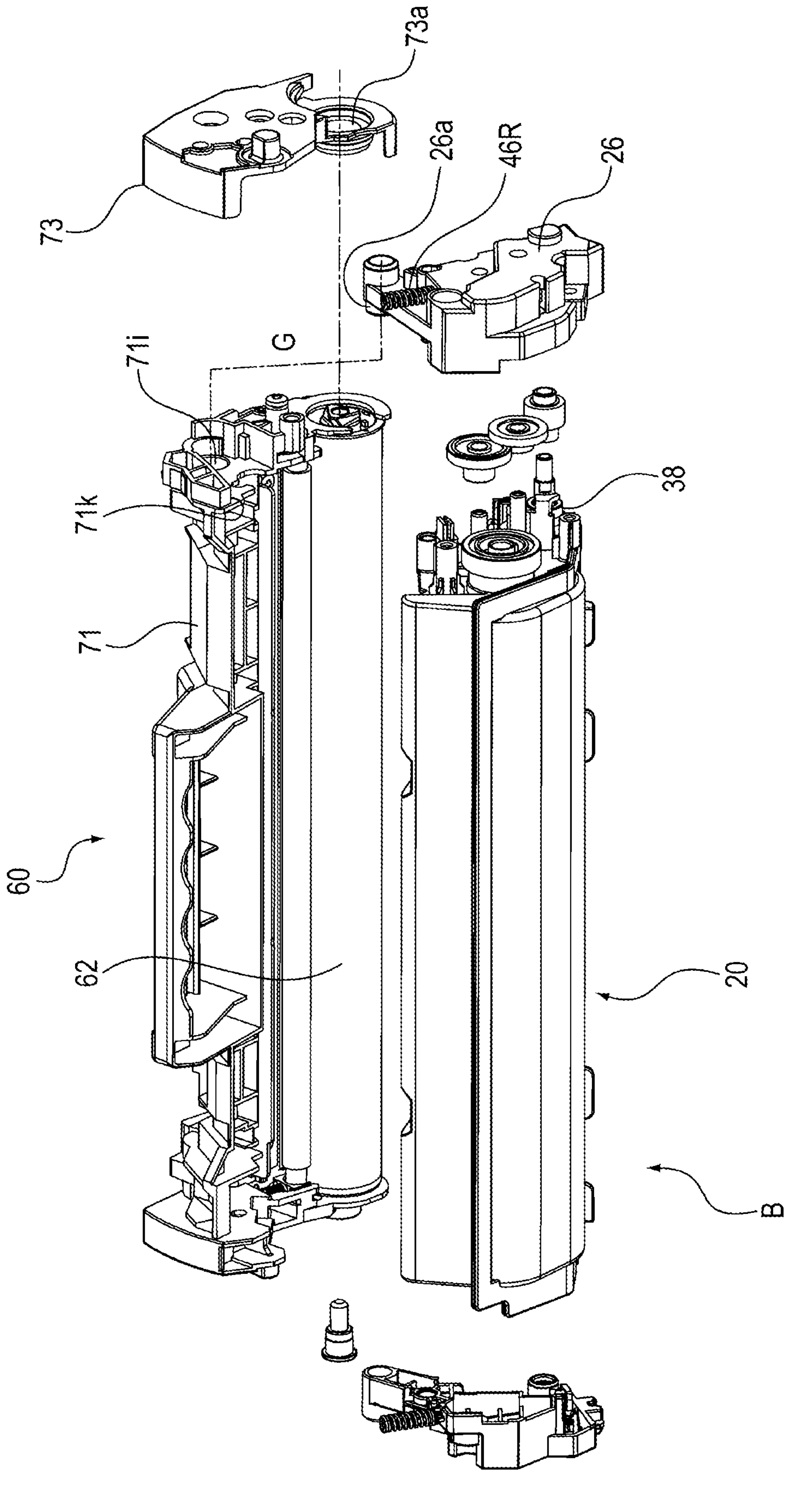
FIG. 4 is an exploded perspective view as viewed from the drive side of the cartridge for the image forming apparatus according to the embodiment.

The cleaning unit 60 is a photosensitive drum unit including the photosensitive drum 62. More specifically, as shown in FIG. 3, the cleaning unit 60 includes the photosensitive drum 62, a receptor sheet 65, a charging roller 66, a cleaning frame 71, a waste toner chamber 71*b*, and a cleaning member 77.

The photosensitive drum 62 is rotatably held by the cleaning unit 60 by the drive side drum flange 63 provided on the drive side being rotatably supported in a hole 73*a* of the drum bearing 73. The photosensitive drum 62 is an image bearing member which carries the latent image or the toner image formed of toner on the surface thereof.

The receptor sheet 65 is provided at the edge of the cleaning frame 71 so as to contact with the photosensitive drum 62 to prevent the waste toner from leaking out of the cleaning frame 71 to the outside.

The charging roller 66 is disposed in contact with the outer peripheral surface of the photosensitive drum 62. The charging roller 66 is rotatably mounted in the cleaning unit 60 by the charging roller bearings 67 at opposite ends in the longitudinal direction of the cleaning frame 71. The charging roller 66 is in pressure contact with the photosensitive drum 62 and is rotated by the rotation of the photosensitive drum 62 by the charging roller bearing 67 being pressed toward the photosensitive drum 62 by the biasing member 68.

The cleaning frame 71 supports the charging roller 66 and the cleaning member 77. The longitudinal direction of the cleaning frame 71 is the same as the longitudinal direction of the cartridge B, and is substantially parallel to an axial direction in which a rotation axis of the photosensitive drum 62 extends. Here, in a broad sense, the drum bearing 73 and the cleaning frame 71 can also be collectively referred to as a cleaning frame.

The waste toner chamber 71*b* is constituted by the cleaning frame 71 and the cleaning member 77, and accumulates the waste toner removed from the surface of the photosensitive drum 62 by the cleaning member 77.

The cleaning member 77 is disposed in contact with the outer peripheral surface of the photosensitive drum 62. The cleaning member 77 includes a rubber blade 77*a* which is a blade-like elastic member made of rubber as an elastic material, and a support member 77*b* which supports the rubber blade 77*a*.

The rubber blade 77*a* is in contact with the photosensitive drum 62 counterdirectionally with respect to the rotational direction of the photosensitive drum 62. That is, the rubber blade 77*a* is in contact with the photosensitive drum 62 so that the free end portion faces the upstream side in the rotational direction of the photosensitive drum 62.

Here, the charging roller 66, the developing roller 32, the transfer roller 7, and the cleaning member 77 are process means which act on the photosensitive drum 62.

<Structure of Memory Tag and its Surroundings>

The structure of the memory tag 24 and its surroundings of the image forming apparatus according to the embodiment of the present invention will be described in detail with reference to FIG. 9.

Figure 9:
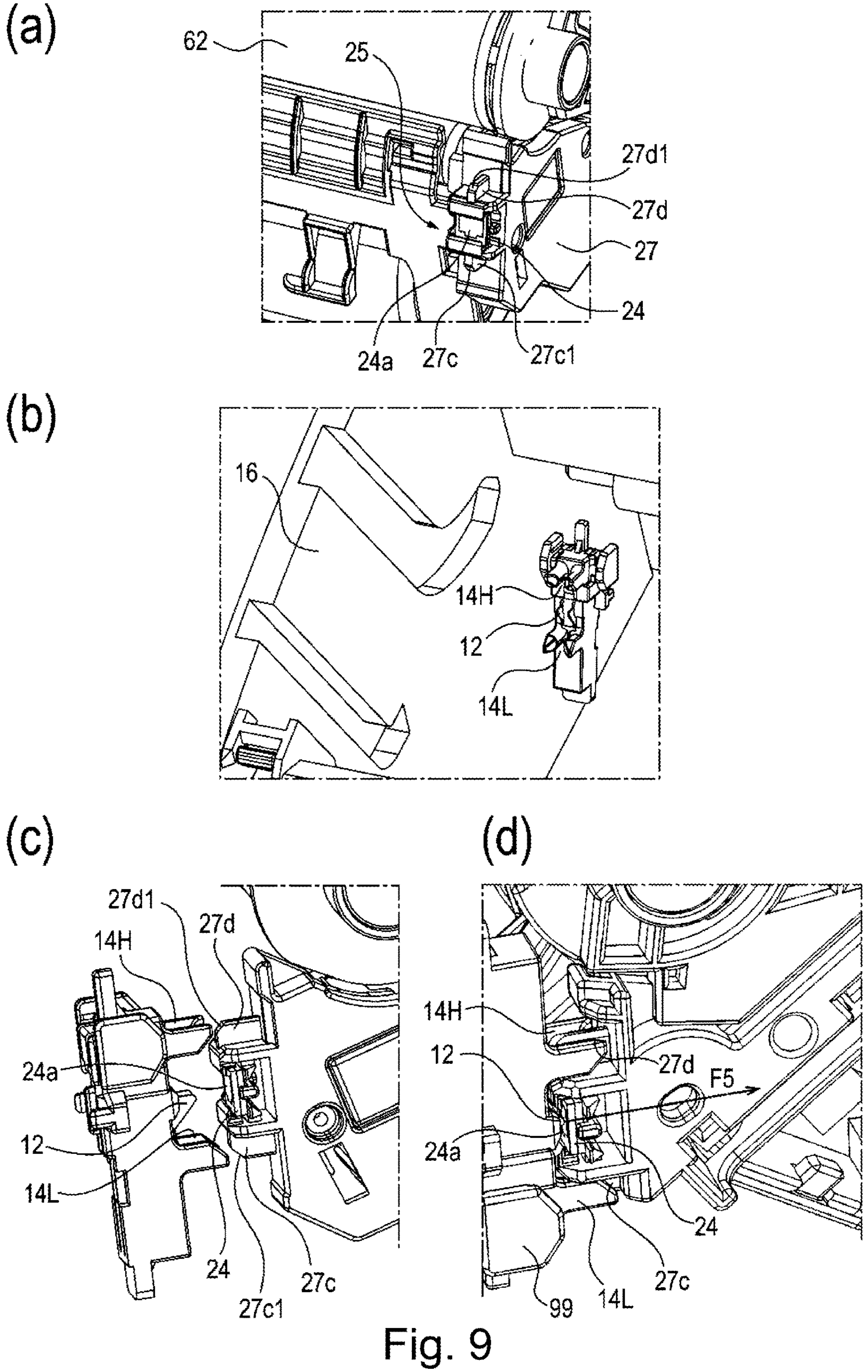
FIG. 9 is a perspective view of a memory tag and the periphery thereof in the image forming apparatus according to the embodiment.

As shown in part (a) of FIG. 9, the cartridge B is provided with a memory tag 24 provided as a storage means including a contact surface 24*a* for communicating with the apparatus main assembly A to input/output information. The memory tag 24 is mounted to the non-driving side bearing member 27 so that the contact surface 24*a* is substantially parallel to the photosensitive drum 62.

The cartridge B is provided with a guide 27*c* and an upper guide 27*d* adjacent to the memory tag 24. The guide 27*c* is formed as a portion of the bearing member 27.

As shown in part (b) of FIG. 9, the apparatus main assembly A includes a communication connector 99 which includes a main assembly contact 12 which is electrically connected to and communicates with the contact surface 24*a* of the memory tag 24, a guided portion 14H and a guided portion 14L adjacent to the main assembly contact 12. The main assembly contact 12, the guided portion 14H, and the guided portion 14L can be moved integrally with each other relative to the apparatus main assembly A by a predetermined amount.

<Assembling Method of Cartridge>

A method for assembling the cartridge B of the image forming apparatus according to the embodiment of the present invention will be described in detail.

First, the center of development first support boss 26*a* of bearing member 26 with respect to first suspension hole 71*i* on the driving side of cleaning frame 71 and the center of development second support boss 27*a* of bearing member 27 with respect to second suspension hole 71*j* on the non-drive side are aligned with each other.

Next, the developing unit 20 is moved in the direction of the arrow G, by which the first support boss 26*a* is fitted into the first suspension hole 71*i*, and the second development support boss 27*a* is fitted into the second suspension hole 71*j*. By this, the developing unit 20 is connected to the cleaning unit 60 so as to be rotatable relative to it, and the developing roller 32 is connected to the photosensitive drum 62 in the state that the developing roller 32 is movable toward and away from the photosensitive drum 62.

Next, the cartridge B is assembled by mounting the drum bearing 73 to the cleaning unit 60.

Figure 5:
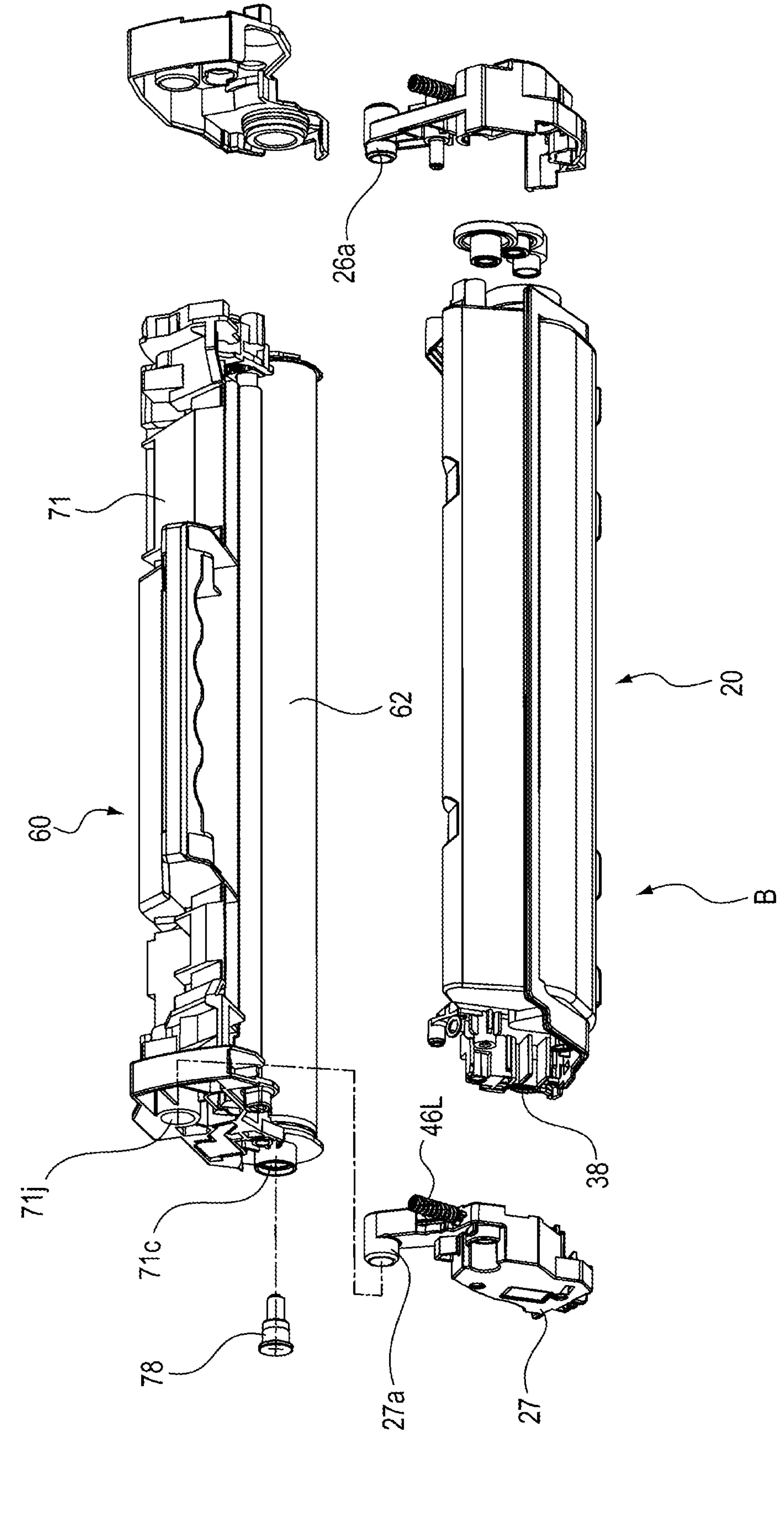
FIG. 5 is an exploded perspective view as seen from the non-driving side of the cartridge of the image forming apparatus according to the embodiment.

As shown in FIG. 5 on the non-driving side of the cartridge B assembled in the manner described above, the cleaning unit 60 is rotatably supported on the apparatus main assembly A by the drum shaft 78 press-fitted into the hole 71*c* of the cleaning frame 71.

In addition, in the cartridge B, the driving side urging member 46L and the non-driving side urging member 46R, which are compression springs, urges the developing unit 20 to the cleaning unit 60 by the urging force of the spring. By this, the developing roller 32 is reliably urged toward the photosensitive drum 62. In addition, the photosensitive drum 62 and the developing roller 32 are held at a predetermined gap by contacting, with a predetermined contact pressure, to the space holding member (spacer) 38 mounted to the respective ends of the developing roller 32, so that the relative position between them is determined.

Here, in order to stably develop the electrostatic latent image on the photosensitive drum 62 with the toner T carried on the peripheral surface of the developing roller 32, it is preferable that the gap between the photosensitive drum 62 and the developing roller 32 is constant and kept accurate. In other words, it is preferable that the gap between the photosensitive drum 62 and the developing roller 32 is stably maintained by the spacing member 38.

<Image Forming Method>

An image forming method in the image forming apparatus according to the embodiment of the present invention will be described in detail.

The photosensitive drum 62 is rotationally driven in the direction of arrow R at a predetermined peripheral speed (process speed) based on the print start signal.

Next, the charging roller 66 to which the bias voltage is applied contacts the outer peripheral surface of the photosensitive drum 62 and charges the outer peripheral surface of the photosensitive drum 62 uniformly.

In addition, the exposure device 3 outputs a laser beam L corresponding to the image information. The laser beam L passes through the laser opening 71*h* of the cleaning frame 71 of the cartridge B, and scans and exposes the outer peripheral surface of the photosensitive drum 62. By this, an electrostatic latent image corresponding to image information is formed on the outer peripheral surface of the photosensitive drum 62.

Furthermore, the toner T in the toner chamber 29 of the developing unit 20 is stirred and fed by the rotation of the stirring member 43, to the toner supply chamber 28, and is applied and carried on the surface of the developing roller 32 by the magnetic force of the magnet roller 34 (fixed magnet) The toner T carried on the surface of the developing roller 32 is triboelectrically charged by the developing blade 42, and the layer thickness of the toner on the peripheral surface of the developing roller 32 is regulated. The toner T carried on the surface of the developing roller 32 is supplied to the photosensitive drum 62 in accordance with the electrostatic latent image. By this, the latent image is developed and visualized into a toner image.

The pick-up roller 5*a* and the feed roller pair 5*b* delivers out the sheet material PA stored in the sheet tray 4 below the apparatus main assembly A from the sheet tray 4 in accordance with the output timing of the laser beam L.

The sheet material PA delivered from the sheet tray 4 is fed to a transfer position between the photosensitive drum 62 and the transfer roller 7 by way of the transfer guide 6, and the toner images are sequentially transferred from the photosensitive drum 62.

The sheet material PA onto which the toner image has been transferred is separated from the photosensitive drum 62 and is fed to the fixing device 9 along the conveyance guide 8.

Next, the sheet material PA fed to the fixing device 9 passes through the nip portion between the heating roller 9*a* and the pressure roller 9*b* constituting the fixing device 9, and is subjected to pressure and heat fixing process at this nip portion, by which the toner image is fixed. The sheet material PA that has been subjected to the toner image fixing process is fed to the discharge roller pair 10, by means of which it is discharged to the discharge tray 11.

On the other hand, after the image transfer, the photosensitive drum 62 is used again in the image forming process after the residual toner on the outer peripheral surface is removed therefrom by the cleaning member 77. The toner removed from the photosensitive drum 62 is stored in the waste toner chamber 71*b* of the cleaning unit 60.

<Mounting Method of Cartridge to Main Assembly>

Figure 6:
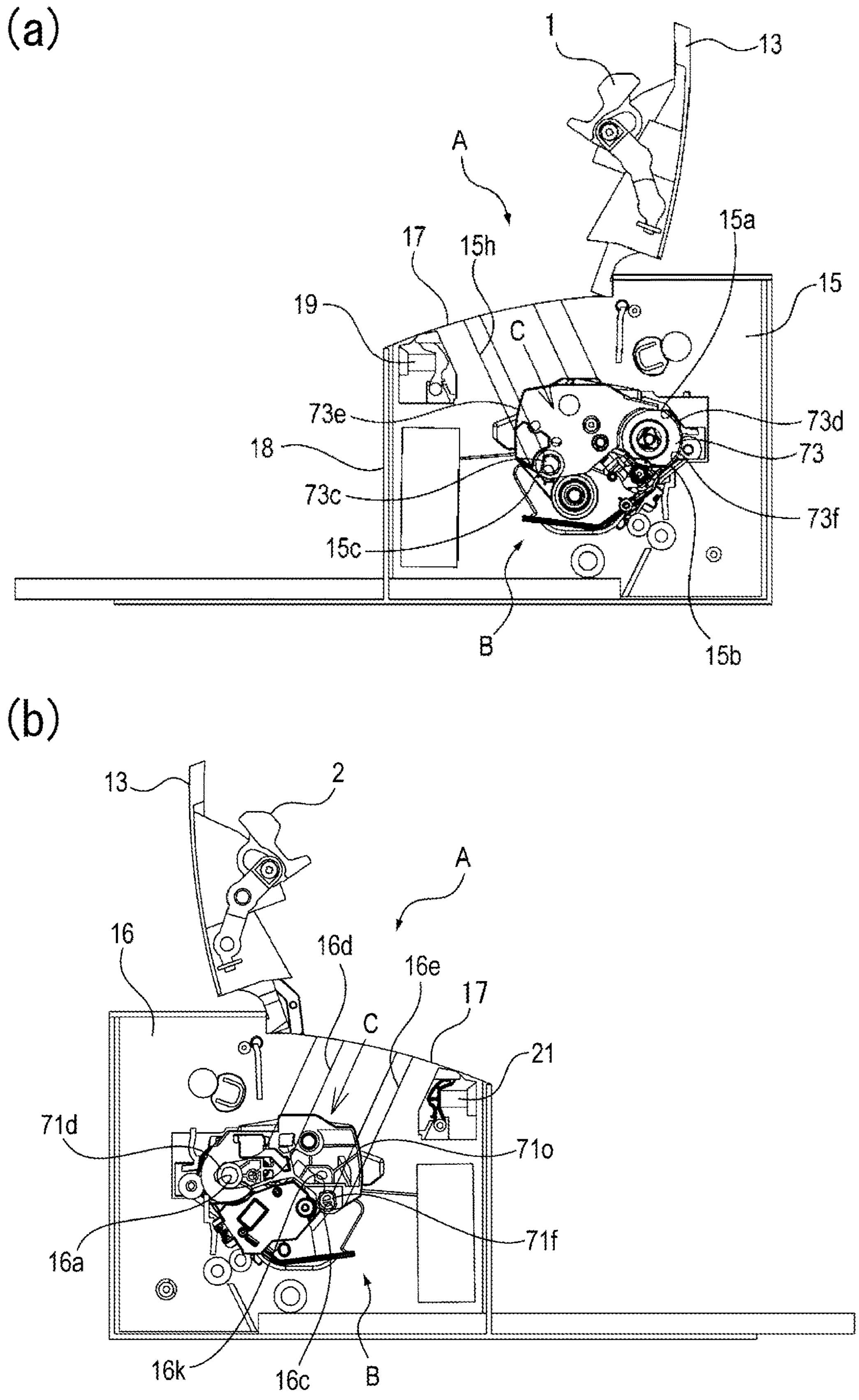
FIG. 6 is a schematic view of the image forming apparatus according to the embodiment with the open/close door opened.
Figure 7:
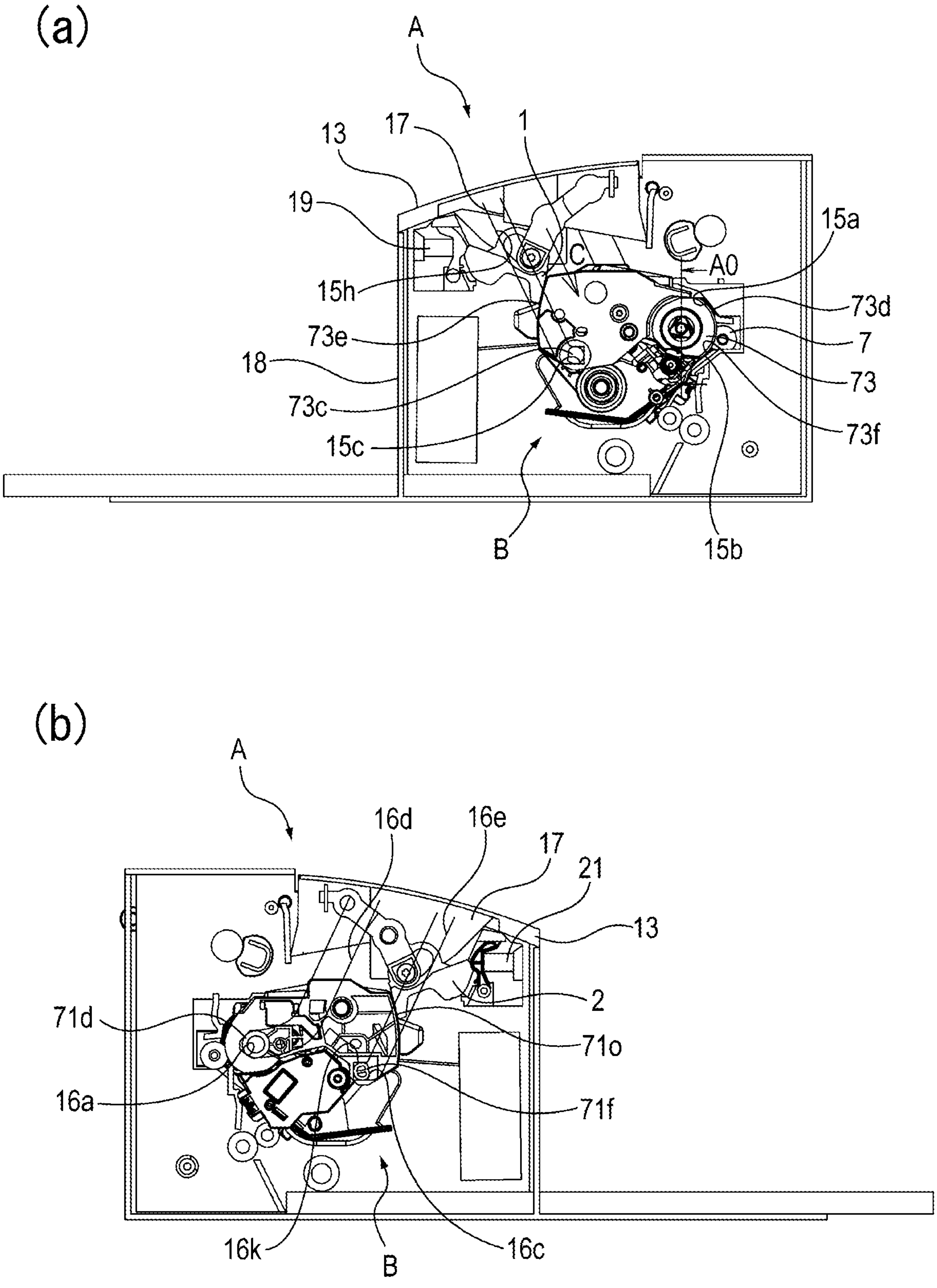
FIG. 7 is a schematic illustration showing a state in which the open/close door of the image forming apparatus according to the embodiment is closed.

Referring to FIG. 6 and FIG. 7, a method for mounting the cartridge B to the apparatus main assembly An of the image forming apparatus according to the embodiment of the present invention will be described in detail.

Here, the first drive side plate 15 of the apparatus main assembly A has a guide rail 15*g* and a guide rail 15*h* as first guide rails. In addition, the non-driving side plate 16 of the apparatus main assembly A has a guide rail 16*d* and a guide rail 16*e* as second guide rails. In addition, the drum bearing 73 provided on the drive side of the cartridge B has a rotation stop portion 73*c*. Furthermore, the cleaning frame 71 has a positioned portion 71*d* as a first positioning portion and a rotation-stopped portion 71*f* as a second positioning portion on the non-driving side in the longitudinal direction.

In addition, the first drive side plate 15 has an upper positioning portion 15*a*, a lower positioning portion 15*b*, and a rotation stop portion 15*c*. In addition, the non-driving side plate 16 has a positioning portion 16*a* and a rotation stop portion 16*c*. Furthermore, the drum bearing 73 has a positioned portion 73*d* and a positioned portion 73*f*.

The mounting direction of the cartridge B is a direction substantially perpendicular to the axis of the photosensitive drum 62 (the direction of arrow C in FIG. 6)

When the cartridge B is mounted through the cartridge insertion opening 17 of the main assembly A, the rotation-stop portion 73*c* on the drive side of the cartridge B is guided (guided) by the guide rail 15*g* and the guide rail 15*h* of the apparatus main assembly A. In addition, the non-driving side positioned portion 71*d* and the rotation-stopped portion 71*f* of the cartridge B are guided by the guide rail 16*d* and the guide rail 16*e* of the apparatus main assembly A, and the cartridge B is positioned at a predetermined position in the apparatus main assembly.

When the positioned portion 71*d* and the rotation stop portion 71*f* are positioned at predetermined positions, the positioned portion 71*d* and the guide rail 16*d* are in contact with the rotation-stop portion 71*f* and the guide rail 16*e*, respectively. By this, the cartridge B is positioned in the image forming position of the apparatus main assembly A.

Next, by closing the door 13, the pressed portion 73*e* of the cartridge B is pressed by the cartridge pressing member 1 urged by the cartridge pressing spring 19 of the apparatus main assembly A. In addition, the pressed portion 71*o* of the cartridge B is pressed by the cartridge pressing member 2 urged by the cartridge pressing spring 21 of the apparatus main assembly A (FIG. 7)

By doing so, on the drive side, the positioned portion 73*d*, the positioned portion 73*f*, and the rotation preventing portion 73*c* of the cartridge B are fixed to the upper positioning portion 15*a*, the lower positioning portion 15*b*, and the rotation stopping portion 15*c* of the apparatus main assembly A, respectively. By this, the cartridge B and the photosensitive drum 62 are positioned at the driving side. In addition, on the non-drive side, the positioned portion 71*d* and the rotation stop portion 71*f* of the cartridge B are fixed to the positioning portion 16*a* and the rotation stop portion 16*c* of the apparatus main assembly A, respectively. By this, the cartridge B and the photosensitive drum 62 are positioned at the non-driving side.

Here, the structure for determining the position of the cartridge B relative to the apparatus main assembly A is not limited to the above-described structure, and the cartridge B may be positioned by directly acting on the driven-side positioning portion 73*d* and the rotation-stopped portion 73*f* and the non-driving-side positioned portion 71*d* and the rotation-stopped portion 71*f*.

<Driving Force Transmission Mechanism From Main Unit to Cartridge>

Figure 8:
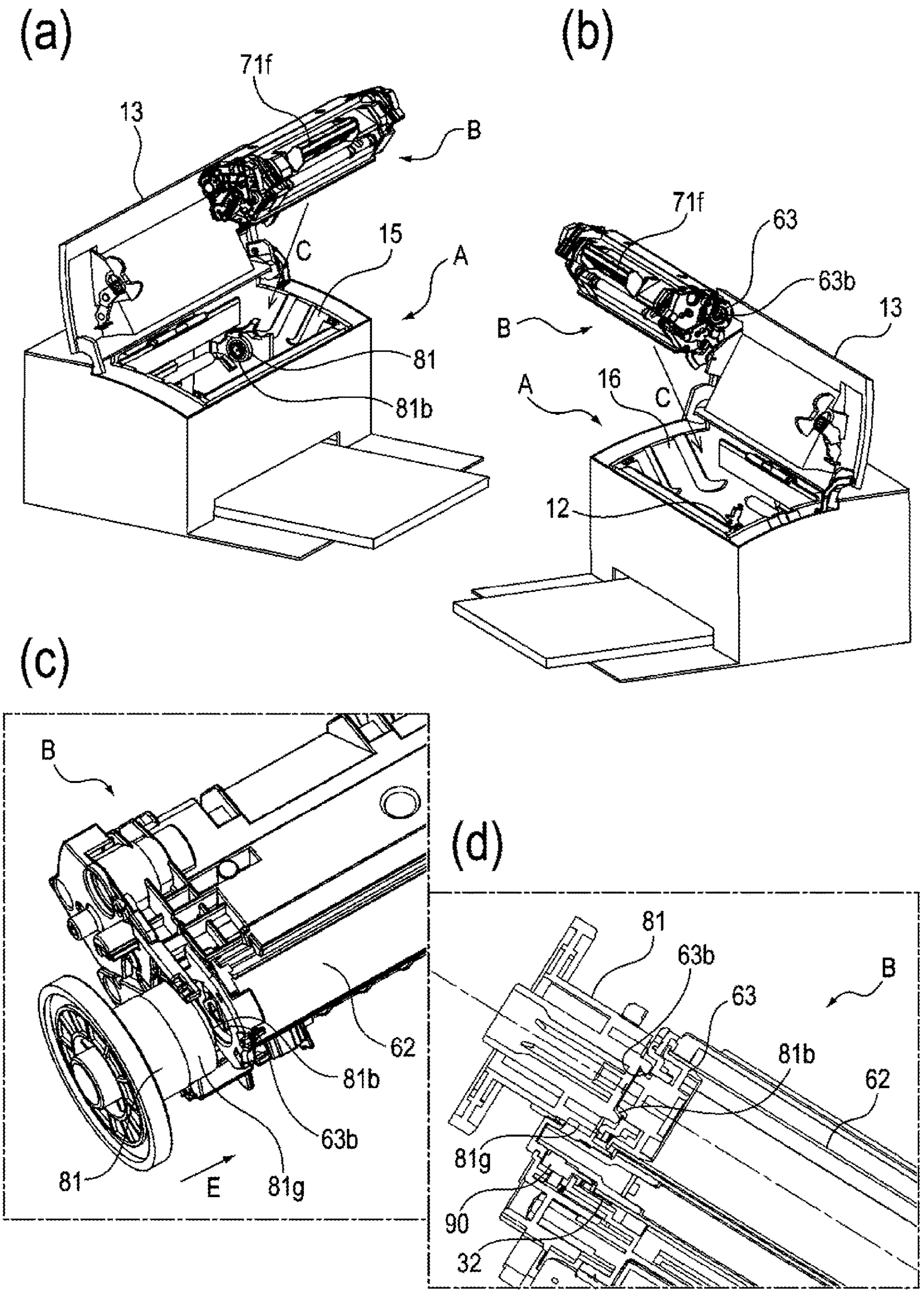
FIG. 8 is a perspective view of the drive unit of the image forming apparatus according to the embodiment.

Referring to FIG. 8, a driving force transmission mechanism for transmitting the driving force from the apparatus main assembly A to the cartridge B of the image forming apparatus according to the embodiment of the present invention will be described in detail.

Here, the apparatus main assembly A is provided with a drive transmission member 81 which transmits the driving force received from a drive source (not shown) of the apparatus main assembly A to the cartridge B. In addition, in the cartridge B, a driving force receiving portion 63*b* is provided on the drive side drum flange 63 in order to engage with the drive transmission member 81 to receive a driving force. In addition, a gear shape 81*g* is provided on an outer periphery of the drive transmission member 81. Furthermore, a developing roller gear 90 is connected to the end of the developing roller 32.

When the door 13 is closed and the power to the main unit A is turned on, the drive transmission member 81 moves in the direction of arrow E in part (c) of FIG. 8.

Next, the drive transmission portion 81*b* of the drive transmission member 81 and the drive passive portion 63*b* of the drive side drum flange 63 engage with each other, and the photosensitive drum 62 rotates through the drive side drum flange 63. In addition, the gear shape 81*g* provided on the drive transmission member 81 and the developing roller gear 90 mesh with each other.

That is, by the drive transmission member 81 driven by the driving force from the drive source, the photosensitive drum 62 is rotated by way of the drive side drum flange 63, and the developing roller 32 also rotates by way of the developing roller gear 90.

<Operation of Memory Tag>

Referring to FIG. 9, the operation of the memory tag 24 of the image forming apparatus according to the embodiment of the present invention will be described in detail.

When the cartridge B is mounted on the apparatus main assembly A, the memory tag 24 comes into contact with the main assembly contact 12 and becomes communicable with the main assembly contact 12.

In the process of mounting the cartridge B to the apparatus main assembly A, as shown in part (c) of FIG. 9, the guided portion 14L and the guide 27*c* of the cartridge B are engaged with each other, and the guided portion 14H and the upper guide 27*d* are engaged with each other. At this time, the main assembly contact 12, the guided portion 14H, and the guided portion 14L are moved and positioned integrally so as to follow the memory tag 24.

The main assembly contact 12 and the memory tag 24 are brought into contact with each other to become in an electrically communicable state as shown in part (d) of FIG. 9, when the mounting of the cartridge B is completed. The main assembly contact 12 has elasticity, and therefore, the contact surface 24*a* of the memory tag 24 contacts with a predetermined pressure therebetween. From this, the cartridge B receives external force from the communication connector 99 of the apparatus main assembly A in the direction perpendicular to the contact surface 24*a* in the memory tag 24. This external force is defined as contact pressure F5 (part (d) of FIG. 9)

<Arrangement of Memory Tag>

Figure 2:
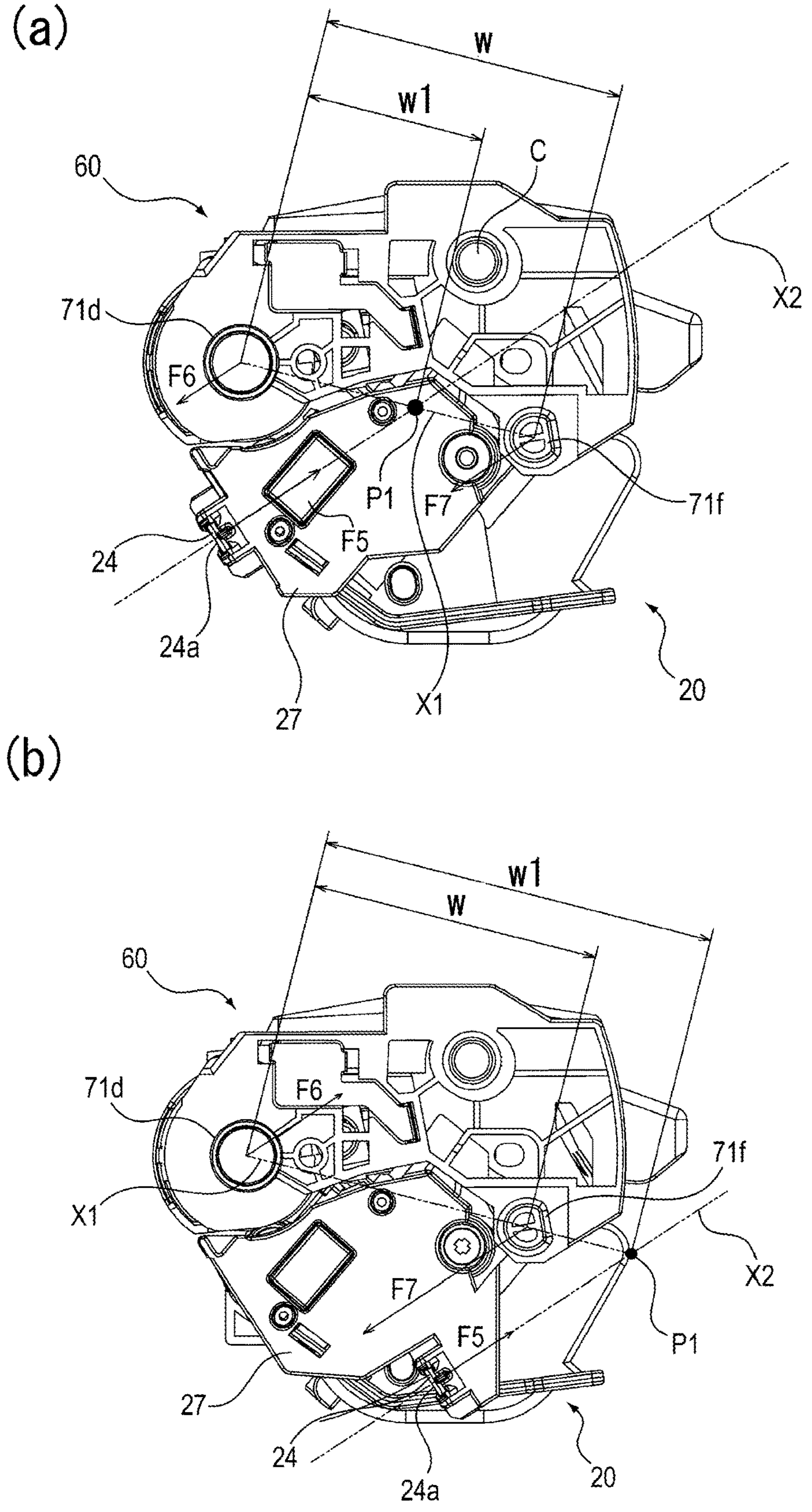
FIG. 2 is a side view of the cartridge of the image forming apparatus according to the embodiment.
Figure 10:
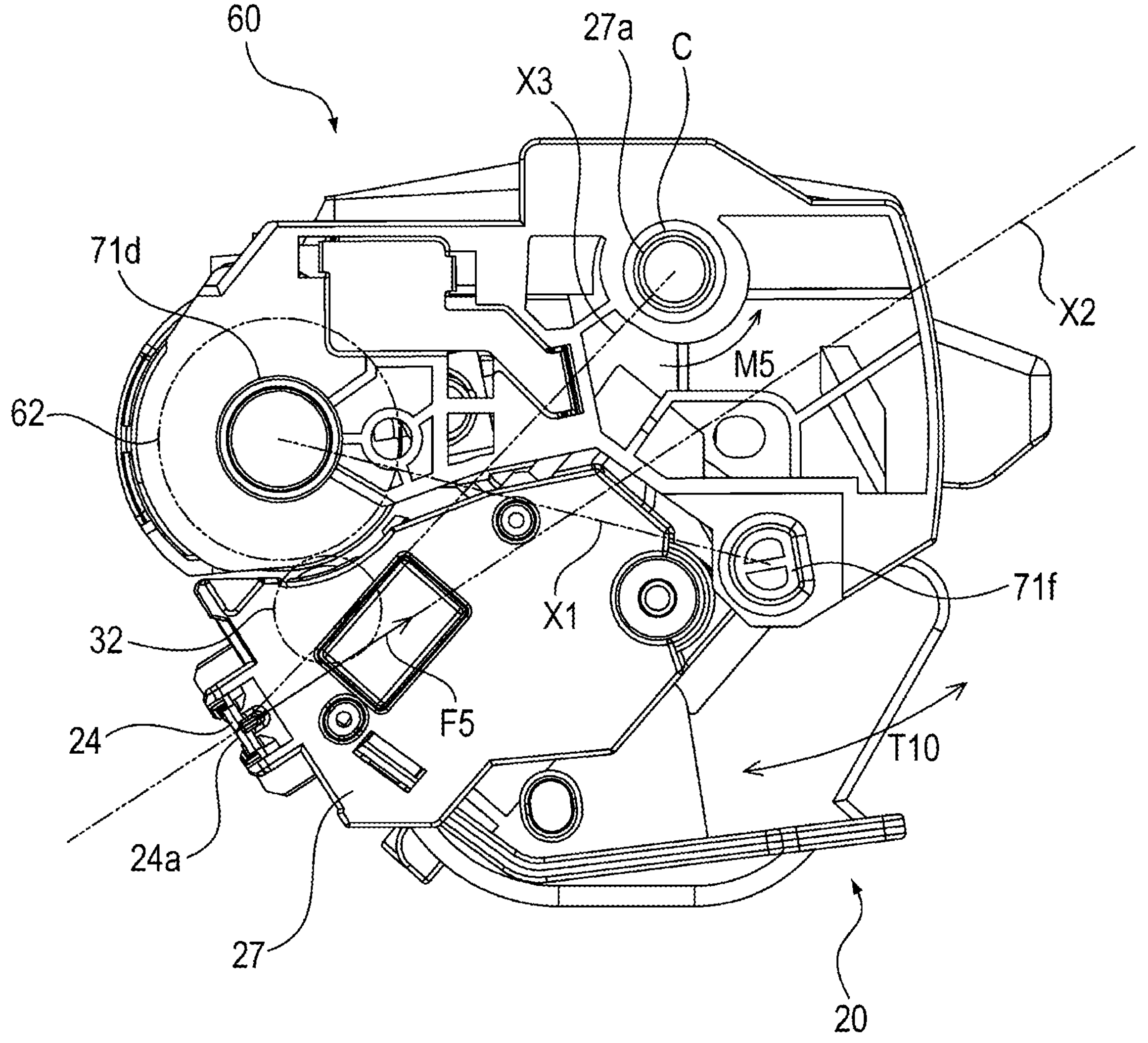
FIG. 10 is a side view illustrating the relationship between the cartridge coupling portion and the memory tag of the image forming apparatus according to the embodiment.
Figure 11:
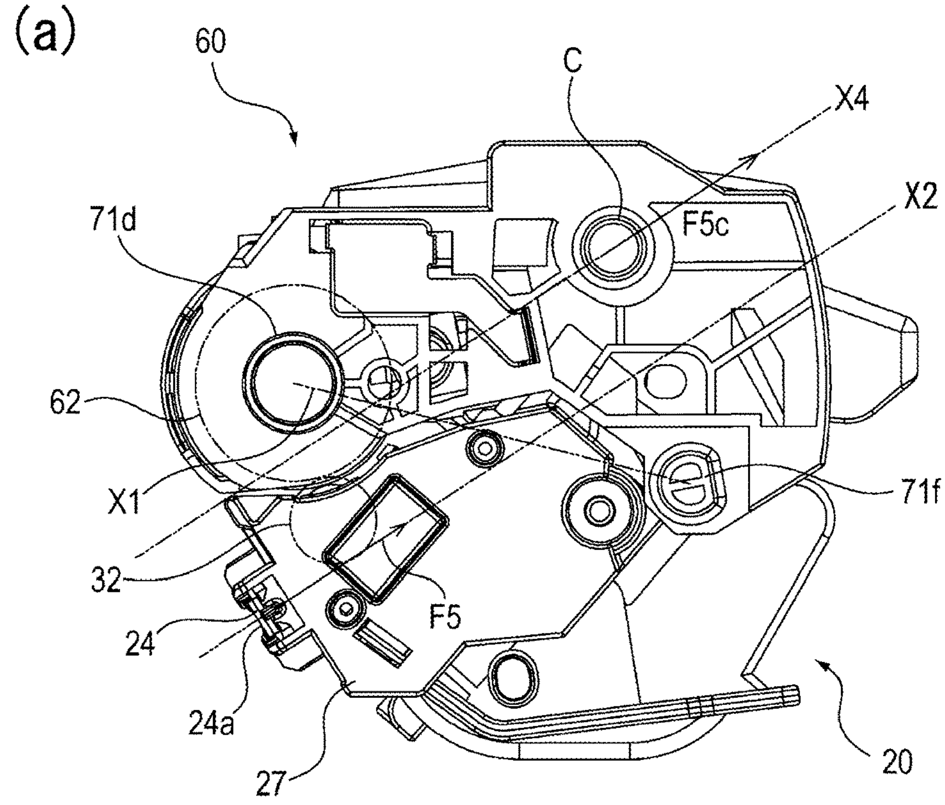
FIG. 11 is a side view, showing an internal force in the cartridge of the image forming apparatus according to the embodiment.
Figure 11:
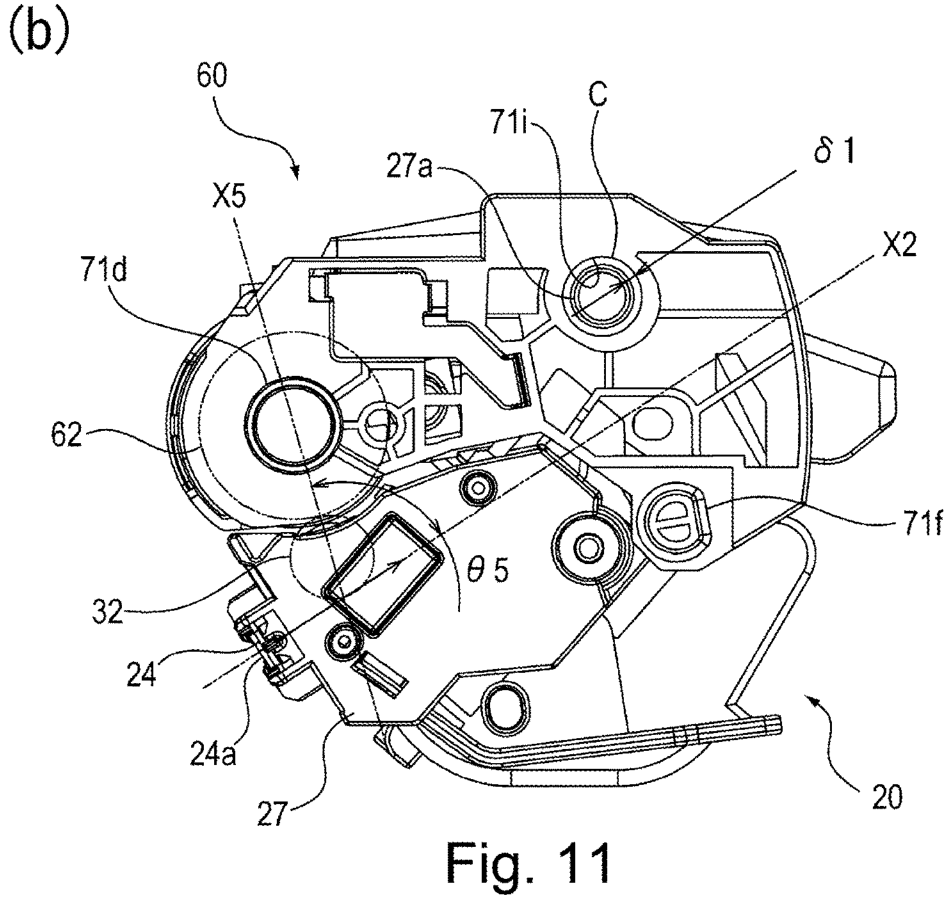

Referring to FIG. 2, FIG. 10 and FIG. 11, the arrangement of the memory tag 24 of the image forming apparatus according to the embodiment of the present invention will be described in detail.

First, with reference to FIG. 2, the relationship between the positioned portion 71*d* and the rotation-stopped portion 71*f* of the cartridge B will be described, focusing on the contact pressure F5 acting on the contact surface 24*a* of the memory tag 24.

Here, a line segment connecting the center of the position determination portion 71*d* (first position determination portion) and the center of the rotation stop portion 71*f* (second position determination portion) is a first line segment X1. In addition, a linear line passing through the contact surface 24*a* of the memory tag 24 and perpendicular to the contact surface 24*a* is a first linear line X2.

The memory tag 24 is arranged such that the first line segment X1 and the first linear line X2 intersect with each other, by which the contact pressure F5 acting on the contact surface 24*a* is arranged so that the direction intersects the first line segment X1. Here, the distance between the positioned portion 71*d* and the rotation stop portion 71*f* is w, and the intersection of the first line segment X1 and the first linear line X2 is a point P1, and a distance from the positioned portion 71*d* to the point P1 is w1. And, when focusing on contact pressure F5, the reaction force F6 acting on the positioned portion 71*d* is given by equation (1), and the reaction force F7 acting on the rotation-stopped portion 71*f* are given by equation (2):

$$F6=(1-w1/w)\times F5 \quad (1)$$

$$F7=(w1/w)\times F5 \quad (2)$$

For example, from the moment balance equation for the rotation about the positioned portion 71*d*, F7*w*=F5*w*1, and equation (2) results. In addition, by substituting this into F7*w*=F5*w*1 from F6+F7=F5 and F7=F5−F6, equation (1) is derived.

The relationship between the distance w and the distance w1 is w>w1 in the case that the first line segment X1 and the first linear line X2 intersect.

At this time, the contact pressure F5, the reaction force F6 which acts on the positioning portion 71*d*, and the reaction force F7 which acts on the rotation-stopped portion 71*f* are in the relationship of equation (3):

$$|F6|+|F7|=|F5| \quad (3)$$

That is, the contact pressure F5, which is an external force, is equal to the sum of the reaction force F6 acting on the positioned portion 71*d* and the reaction force F7 acting on the rotation-stopped portion 71*f*.

Next, as shown in part (b) of FIG. 2, when the memory tag 24 is arranged such that the first line segment X1 and the first linear line X2 do not intersect with each other, the relationship between the distance w and the distance w1 is w<w1.

In this case, the contact pressure F5, the reaction force F6 which acts on the positioning portion 71*d*, and the reaction force F7 which acts on the rotation-stopped portion 71*f* are in the relationship of equation (4):

$$|F6|+|F7|>|F5| \quad (4)$$

That is, the contact pressure F5, which is an external force, is smaller than the sum of the reaction force F6 acting on the positioned portion 71*d* and the reaction force F7 acting on the rotation-stopped portion 71*f*.

As described above, the memory tag 24 is arranged such that the first line segment X1 and the first linear line X2 intersect with each other, by which the position of the cartridge B can be determined so as not to generate a reaction force larger than the contact pressure F5 that is an external force in the cartridge B.

By this, it is possible to suppress deformation due to the contact pressure F5 in the positioned portion 71*d* and the rotation-stopped portion 71*f*, and therefore, it is possible to reduce the deviation of the connecting portion C between the developing unit 20 and the cleaning unit 60. By this, the positional deviation of the developing unit 20 including the developing roller 32 can be reduced relative to the cleaning unit 60 including the photosensitive drum 62, and therefore, the positional deviation of the developing roller 32 relative to the photosensitive drum 62 can be reduced. Therefore, the position of the developing roller 32 can be accurately maintained relative to the photosensitive drum 62, and the contact pressure of the developing roller 32 relative to the photosensitive drum 62 can be stabilized.

Next, referring to Figure and, the relationship of the arrangement of the coupling portion C of the developing unit 20 and the memory tag 24 relative to the cleaning unit 60 will be described.

The developing unit 20 is connected to the cleaning unit 60 so as to be rotatable (rotatable) in the direction of the arrow T10. In addition, the developing roller 32 is connected to the photosensitive drum 62 in a state in which the developing roller 32 can contact to and separate from the photosensitive drum 62.

Here, as shown in FIG. 10, a linear line connecting the memory tag 24 and the center of the development second support boss 27*a* of the bearing member 27 is a second line segment X3.

The memory tag 24 and the development second support boss 27*a* are arranged such that the first line segment X1 and the second line segment X3 intersect with each other, and the first line segment X1 and the first linear line X2 intersect with each other. At this time, as shown in FIG. 10, by the contact pressure F5 as the external force acting on the memory tag 24, a moment M5 is produced about the development second support boss 27*a*. By the action of the moment M5, the contact pressure when the photosensitive drum 62 and the developing roller 32 are urged to each other by way of the spacing member 38 changes.

However, the memory tag 24 and the development second support boss 27*a* are arranged such that the first line segment X1 and the second line segment X3 intersect each other, and the first line segment X1 and the first linear line X2 intersect with each other. By this, the contact pressure F5 is directed to the neighborhood of the development second support boss 27*a* as the rotation center of the developing unit 20. That is, the moment M5 can be reduced, and the influence of the moment M5 on the contact pressure to make the developing roller 32 close to the photosensitive drum 62 can be reduced, and therefore, the contact pressure applied by way of the spacer 38 can be stabilized.

Next, referring to FIG. 11, the arrangement of the memory tag 24 will be described, focusing on the internal force of the cartridge B.

As shown in part (a) of FIG. 11, the contact pressure F5 as an external force acts on the coupling portion C by way of the developing unit 20. The force F5*c* acting on the coupling portion C acts in the direction of the second linear line X4 which passes through the coupling portion C and is perpendicular to the contact surface 24*a* of the memory tag 24 and is parallel to the first linear line X2.

The memory tag 24 is arranged such that the second linear line X4 parallel to the direction of the force F5*c* and the first line segment X1 intersect with each other. By this, the force F5*c* is a central load with respect to the cleaning unit 60 supported at both ends by the positioned portion 71*d* and the rotation stop portion 71*f*, and therefore, the deformation of the coupling portion C due to the force F5*c* can be suppressed, and the positional deviation of the coupling portion C can be reduced.

Therefore, the positional deviation of the developing unit 20 including the developing roller 32 can be reduced relative to the cleaning unit 60 including the photosensitive drum 62. That is, the positional deviation of the developing roller 32 relative to the photosensitive drum 62 can be reduced, and the position of the developing roller 32 can be accurately maintained relative to the photosensitive drum 62, and therefore, the contact pressure in the direction of the developing roller 32 approaching the photosensitive drum 62 can be stabilized.

In addition, the developing roller gear 90 is disposed so as to mesh with a gear shape 81*g* provided on the drive transmission member 81, when the drive passive portion 63*b* of the drive side drum flange 63 is engaged with the drive transmission member 81 (part (d) of FIG. 9) The drive transmission member 81 is arranged coaxially with the photosensitive drum 62, and the developing roller gear 90 is arranged coaxially with the developing roller 32. That is, in order to stably mesh the gear shape 81*g* and the developing roller gear 90 with each other when the drive transmission member 81 and the drive passive portion 63*b* are engaged with each other, it is preferable to precisely determine the position of the developing roller 32 relative to the photosensitive drum 62.

In addition, as shown in part (b) of FIG. 11, when cartridge B is set in place in the main unit A, there is substantially a gap Δ1 between the first suspension hole 71*i* of the cleaning frame 71 in the coupling portion C and the development second support boss 27*a* of the bearing member 27.

Therefore, the developing unit 20 which receives the contact pressure F5 attempts to translate in the direction of the contact pressure F5.

On the contrary, as shown in part (b) of FIG. 11, as the cartridge B is seen from the non-drive side, a linear line passing through the center of the photosensitive drum 62 and the center of the developing roller 32 is a third linear line X5.

The memory tag 24 is arranged such that two sides of the first linear line X2 and the third linear line X5 in the triangle surrounded by the first linear line X2 indicating the direction of the contact pressure F5 and the first line segment X1 form an angle θ5 which is an acute angle. By this, the developing roller 32 tends to move in a direction in contact with the photosensitive drum 62, and therefore, even when the contact pressure F5 acts on the developing unit 20, the developing roller 32 is not easily separated from the photosensitive drum 62. By this, the gear shape 81*g* of the drive transmission member 81 and the developing roller gear 90 can be stably meshed with each other.

As described above, in this embodiment, the first line segment X1 and the first linear line X2 intersect each other as viewed in the axial direction of the photosensitive drum 62.

The present invention is not limited to the above-described embodiment, and can be variously modified without departing from the gist of the present invention.

INDUSTRIAL APPLICABILITY

As has been described in the foregoing, it is possible to suppress the deformation of the process cartridge due to the force acting on the memory portion and to stabilize the pressing force of the developing roller against the photosensitive drum by way of the spaces therebetween.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-247839 filed on Dec. 28, 2018, which is hereby incorporated by reference herein in its entirety.

The invention claimed is:

1. A process cartridge detachably mountable to a main assembly of an image forming apparatus in a mounting direction, the process cartridge comprising:

a photosensitive drum unit provided with (i) a photosensitive drum that is rotatable about a first rotational axis, (ii) a first positioning portion configured to position the process cartridge relative to the main assembly in the mounting direction, the first positioning portion being provided on a side of an end portion of the process cartridge in a direction of the first rotational axis, (iii) a second positioning portion configured to position the process cartridge relative to the main assembly to restrict a rotation of the process cartridge relative to the main assembly, the second positioning portion being provided on an upstream side of the first positioning portion in the mounting direction and on the side of the first end portion in the direction of the first rotational axis, and (iv) a first driving force receiving portion configured to receive a driving force from the main assembly to rotate the photosensitive drum about the first rotational axis;

a developing unit including a developing roller rotatable about a second rotational axis, the developing unit being provided with (i) a memory having a contact surface electrically contactable to a main assembly contact of the main assembly to communicate with the main assembly and provided on the side of the end portion in the direction of the first rotational axis, (ii) a supported portion supported by the photosensitive drum unit such that the developing unit is capable of rotating relative to the photosensitive drum unit, and (iii) a second driving force receiving portion configured to receive a driving force from the main assembly to rotate the developing roller about the second rotational axis, the second driving force receiving portion being provided farther from a center of the developing roller in the direction of the second rotational axis than the first driving force receiving portion is from the center of the developing roller; and an urging member configured to urge the developing unit such that the developing roller is moved closer to the photosensitive drum unit, wherein, as seen in the direction of the first rotational axis, a line segment connecting a center of the first positioning portion and a center of the second positioning portion and a linear line passing through the contact surface and perpendicular to the contact surface intersect with each other at an intersection, and wherein the intersection is located at a position closer to the second positioning portion than to the first positioning portion.

2. A process cartridge according to claim 1, wherein the line segment is a first line segment, and wherein, as seen in the direction of the first rotational axis, a second line segment connecting the memory and the supported portion of the photosensitive drum unit and the first line segment intersect each other.

3. A process cartridge according to claim 1, wherein the linear line is a first linear line, and wherein, as seen in the direction of the first rotational axis, a second liner line passing through the supported portion and parallel to the first linear line intersect each other.

4. A process cartridge according to claim 1, wherein the linear line is a first linear line, and wherein, as seen in the direction of the first rotational axis, a third second linear line passing through a center of the photosensitive drum and a center of the developing roller, the line segment, and the first linear line form a triangle in which an angle formed between the second linear line and the first linear line is an acute angle.

5. A process cartridge according to claim 1, wherein the developing roller is contactable to and separatable from the photosensitive drum.

6. A process cartridge according to claim 1, wherein the first positioning portion is capable of being guided by a first guiding rail provided in the main assembly, wherein the second positioning portion is capable of being guided by a second guiding rail provided in the main assembly, and wherein the process cartridge is positioned relative to the main assembly in the image forming apparatus by the first positioning portion contacting the first guiding rail and the second positioning portion contacting the second guiding rail.

7. A process cartridge according to claim 1, wherein the developing unit includes a developing frame configured to rotatably support the developing roller about the second rotational axis, wherein the supported portion is a boss projecting outward with respect to the direction of the second rotational axis from an end surface of the developing frame in the direction of the second rotational axis, wherein the photosensitive drum unit includes a drum frame configured to rotatably support the photosensitive drum about the first rotational axis, the drum frame being provided with a boss supporting portion configured to support the boss, and wherein the developing unit is supported by the photosensitive drum unit so as to be rotatable to the photosensitive drum unit by the boss being supported by the boss supporting portion of the drum frame.

* * * * *